UNITED STATES PATENT OFFICE.

CHARLES PECK, OF CHICAGO, ILLINOIS.

PREPARATION OF SOUR MILK.

SPECIFICATION forming part of Letters Patent No. 238,248, dated March 1, 1881.

Application filed September 1, 1879.

*To all whom it may concern:*

Be it known that I, CHARLES PECK, of the city of Chicago, county of Cook, and State of Illinois, have invented a new and useful article of manufacture. This article of manufacture is a prepared acid of sour milk or buttermilk for use for culinary and other domestic purposes in which sour milk and buttermilk have heretofore been used, and is fully described in the following specification.

The object of my invention is to supply to the art of cooking, in an indestructible form, the acid of sour milk and buttermilk, and at the same time to supply it in a form fully available at all times for all lines of cooking, or uses for diet for which or in which sour milk or buttermilk is or may be used.

It is well known that sour milk, including buttermilk, is used to a great extent in the ordinary processes of cooking, and that while the demand for this material is constant the supply and quality are, from the perishable nature of the substance, very uncertain and irregular. To remedy this in some directions numerous compositions, usually taking the name and form of "baking-powders," have been adopted in the art of cooking, in order to supply to the material used the acid necessary to perfect success; but while imperfect substitutes for sour milks in certain branches of the culinary art have been secured many of them are composed, in part, of sharp acids and other injurious substances whose nature the public, that uses them, has no means of ascertaining.

I have made the discovery (and this is an element of my invention) that the valuable acids of sour and decaying milks are not destroyed, but may be fixed and preserved by proper and thorough desiccation. To secure these acids, sour milk or buttermilk is placed in shallow pans, suitable for drying the mass rapidly. The pans containing the milk are placed in a heated room, so constructed that there is a rapid passage of heated air of a temperature of 180° Fahrenheit over the pans and in contact with the milk. Here they should remain until the process of drying is complete, a perfect desiccation is effected, and the mass becomes solidified.

I do not confine myself to any special method of drying, for any suitable process which will effect the result mentioned may be used. The solid mass may then be ground into a fine powder or flour. The product thus obtained retains all the valuable acid properties of the mild and innocent acid previously existing in the sour milk. It is in this form conveniently handled, and may be kept for a long time in closed or open cans, boxes, or barrels in a condition of freshness and purity, and is available at all times for the domestic purposes for which a milk-acid is desired, it being only necessary to apply moisture to the preparation to render it fit for use.

As sour milk and buttermilk are constantly passing from one stage of decay to another, thereby losing their acid properties, it is difficult to obtain them at all times in a proper condition for successful use, and large quantities of these products go to waste, while other acids must be used to supply the need for an acid in culinary operations.

The method herein described achieves the result of preserving, in permanent form, the element of these sour milks of special value to the art of cooking and for domestic wants, and of converting a comparatively useless substance into an article of important daily need.

I do not claim any particular method of converting these substances, the treatment of either of which is the same, nor any process of reducing them to powder; but

I claim—

As a new article of manufacture, the herein-described dried and powdered sour milk, having preserved therein a previously-developed acid of milk, and being designed as a substitute for cream of tartar or other acid compounds for culinary purposes.

CHARLES PECK.

Witnesses:
 SAMUEL DANZIGER,
 CHARLES H. ROBERTS.